(12) United States Patent
Fimml et al.

(10) Patent No.: US 12,085,030 B2
(45) Date of Patent: Sep. 10, 2024

(54) INTERNAL COMBUSTION ENGINE AND A METHOD FOR OPERATING SUCH AN INTERNAL COMBUSTION

(71) Applicant: INNIO Jenbacher GmbH & Co OG, Jenbach (AT)

(72) Inventors: Wolfgang Fimml, Tirol (AT); Nikolaus Spyra, Innsbruck (AT)

(73) Assignee: Innio Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 18/038,984

(22) PCT Filed: Nov. 30, 2020

(86) PCT No.: PCT/AT2020/060427
§ 371 (c)(1),
(2) Date: May 26, 2023

(87) PCT Pub. No.: WO2022/109633
PCT Pub. Date: Jun. 2, 2022

(65) Prior Publication Data
US 2023/0417201 A1 Dec. 28, 2023

(51) Int. Cl.
*F02B 19/10* (2006.01)
*F02B 29/04* (2006.01)
(Continued)

(52) U.S. Cl.
CPC ...... *F02D 41/0027* (2013.01); *F02B 19/1028* (2013.01); *F02B 29/0406* (2013.01);
(Continued)

(58) Field of Classification Search
CPC .. F02B 19/10; F02B 19/1028; F02B 29/0406; F02B 43/10; F02B 43/12; F02B 13/0234;
(Continued)

(56) References Cited

U.S. PATENT DOCUMENTS

| 5,203,298 A * | 4/1993 | Manolis ............... F02B 19/108 |
| | | 123/266 |
| 9,765,682 B2 * | 9/2017 | Chiera ................... F02B 19/18 |

(Continued)

FOREIGN PATENT DOCUMENTS

| EP | 2558696 B1 | 4/2015 |
| JP | 2007113461 A | 5/2007 |

(Continued)

OTHER PUBLICATIONS

PCT International Search Report and Written Opinion; Application No. PCT/AT2020/060427; dated Aug. 5, 2021; 17 pages.

(Continued)

*Primary Examiner* — Dapinder Singh
(74) *Attorney, Agent, or Firm* — Fletcher Yoder, P.C.

(57) ABSTRACT

Internal combustion engine, preferably a gas engine, comprising a pre-chamber having a pre-chamber intake system and a main combustion chamber having a main combustion chamber intake system, wherein by use of the intake systems a predetermined amount of energy of fuel can be supplied to the main combustion chamber for a combustion, wherein a control unit is configured to control the intake systems according to the following operation modes:
  a first operation mode, in which a majority of a fuel energy amount for the combustion in the main combustion chamber is supplied directly to the main combustion chamber by use of the main combustion chamber intake system, and
  a second operation mode, in which a majority of the fuel energy amount for the combustion in the main combustion chamber is supplied via the pre-chamber to the main combustion chamber by use of the pre-chamber intake system.

20 Claims, 1 Drawing Sheet

(51) Int. Cl.
  *F02D 13/02* (2006.01)
  *F02D 19/06* (2006.01)
  *F02D 41/00* (2006.01)

(52) U.S. Cl.
  CPC ..... *F02D 13/0234* (2013.01); *F02D 19/0607* (2013.01); *F02D 19/0644* (2013.01); *F02D 19/0647* (2013.01); *F02D 41/0007* (2013.01); *F02D 2041/001* (2013.01)

(58) Field of Classification Search
  CPC .............. F02D 19/023; F02D 19/0607; F02D 19/0644; F02D 19/0647; F02D 29/06; F02D 41/0007; F02D 41/0027; F02D 2041/001; Y02T 10/12; Y02T 10/30; Y02T 10/40
  See application file for complete search history.

(56) References Cited

U.S. PATENT DOCUMENTS

| | | | | |
|---|---|---|---|---|
| 9,840,963 | B2* | 12/2017 | Chiera | .................... F02B 19/12 |
| 10,066,580 | B2* | 9/2018 | Assanis | ..................... F02F 3/28 |
| 11,319,866 | B1* | 5/2022 | VanDerWege | ......... F02M 23/00 |
| 2013/0005598 | A1 | 3/2013 | Gruber et al. | |
| 2013/0291834 | A1* | 11/2013 | Diehl | ...................... F02P 17/02 123/406.12 |
| 2014/0083391 | A1* | 3/2014 | Gruber | ................... F02B 19/12 123/260 |
| 2018/0003132 | A1 | 1/2018 | Ginter et al. | |
| 2018/0066571 | A1 | 3/2018 | Boyde et al. | |
| 2018/0363539 | A1* | 12/2018 | Shelby | ................... F02B 19/12 |
| 2020/0166006 | A1 | 5/2020 | Lejon | |
| 2021/0388755 | A1* | 12/2021 | Asai | ..................... F01N 3/0253 |

FOREIGN PATENT DOCUMENTS

JP 2019183815 A 10/2019
WO 2014053167 A1 4/2014

OTHER PUBLICATIONS

European extended search Report of EP Application No. 23220451.1 dated Apr. 5, 2024; 9 pages.

* cited by examiner

INTERNAL COMBUSTION ENGINE AND A METHOD FOR OPERATING SUCH AN INTERNAL COMBUSTION

CROSS-REFERENCE TO RELATED APPLICATION

This application is a National Stage entry from, and claims benefit of, PCT Application No. PCT/AT2020/060427, filed on Nov. 30, 2020; entitled "INTERNAL COMBUSTION ENGINE AND A METHOD FOR OPERATING SUCH AN INTERNAL COMBUSTION", which is herein incorporated by reference in its entirety.

BACKGROUND

The present invention relates to an internal combustion engine and a method for operating such an internal combustion engine.

It is known to use internal combustion engines, especially stationary gas engines, in the electrical energy production sector, i.e., a gas engine driving an electrical generator (genset) acting as a power plant for a wide range of applications. A further possible application of stationary internal combustion engines is to drive pumps and compressors, e.g., for use in the oil industry.

Such internal combustion engines, starting from a certain size (generally with cylinder capacity above four to five liters), make it necessary to use ignition amplifiers in order to properly ignite the lean air-fuel-mixture in the large volume of the main combustion chambers. As known, internal combustion engines having pre-chambers comprise a fluidic connection between the main combustion chambers and the pre-chambers, also named transfer passages.

Regardless of the type of application, the reduction of emissions to meet the requirements of (increasingly strict) emission standards is one of the main challenges for suppliers of internal combustion engines or stationary gas engines.

In the past, a lot of different approaches to reduce emissions were carried out, e.g., using different kinds of catalysts.

Modern strategies to reduce emissions (and preferably increase the combustion efficiency) in gas engines are the use of alternative fuels (alternative to natural gas), e.g., hydrogen. One of the main challenges for this approach is to handle the infrastructural limitations, i.e., to handle the fuel supply to the internal combustion engine from fuel sources of a diverse kind, while having limited availability of alternative fuels such as hydrogen.

Furthermore, as the market offer of alternative fuels (e.g., hydrogen) increases continuously and the price of these alternative fuels decreases, it is desirable to generate a method to use alternative fuels for above-described internal combustion engines.

Of course, also due to the infrastructural circumstances, common fuel gases such as natural gas is still widely used. One of the challenges in this technical field of internal combustion engines, especially gas engine power plants, is therefore to introduce flexibility for the use of different fuels while keeping the costs for implementation as low as possible.

General prior art describing the supply of hydrogen into the main combustion chamber in order to reduce emissions is, e.g., US 2018/0003132 A1. Document EP 2 558 696 B1 describes the supply of hydrogen into the pre-chamber in order to reduce soot emissions.

BRIEF DESCRIPTION

An aspect of the invention is to provide an internal combustion engine and a method for operating an internal combustion engine, wherein the flexibility for different fuel types is improved, preferably without introducing additional cost for, e.g., additional fuel injectors.

This aspect is achieved by an internal combustion engine with the features of the claims set forth below and a method for operating an internal combustion engine with the features of the claims set forth below.

According to certain embodiments of the invention, it is provided that the internal combustion engine, preferably a gas engine, comprises a pre-chamber having a pre-chamber intake system and a main combustion chamber having a main combustion chamber intake system, wherein by use of the intake systems a predetermined amount of energy of fuel can be supplied to the main combustion chamber for a combustion, and wherein a control unit is configured to control the intake systems according to the following operation modes:
- a first operation mode, in which a majority of a fuel energy amount for the combustion in the main combustion chamber is supplied directly to the main combustion chamber by use of the main combustion chamber intake system, and
- a second operation mode, in which a majority of the fuel energy amount for the combustion in the main combustion chamber is supplied via the pre-chamber to the main combustion chamber by use of the pre-chamber intake system.

Therefore, it can be provided by certain embodiments of the invention that in a first operation mode the internal combustion can be operated by an air-fuel-mixture—preferably a first fuel—which is supplied with a majority by the main combustion chamber intake system directly to the main combustion chamber.

Pre-chambers usually serve as ignition intensifiers, wherein the fuel-air mixture that is highly compressed at the end of the compression stroke is ignited in a relatively small secondary space separate from the main combustion chamber of the cylinders. In this case, a main combustion chamber is delimited by the working piston, the cylinder liner and (a flame plate of) the cylinder head, wherein the secondary space (the pre-chamber) is connected to the main combustion chamber via one or a plurality of transfer passages.

In general, a pre-chamber combustion process is applied, where only fuel is supplied to the pre-chamber to be mixed with air or a lean air-fuel mixture from the main combustion chamber during the compression stroke ending up at an approximate stoichiometric lambda value in the pre-chamber (generally between 0.8 and 1.2).

Another pre-chamber fuel supply concept comprises that the pre-chamber is scavenged with a fuel-air mixture from outside, i.e., when the fuel-air mixture is supplied to the pre-chamber via a dedicated pre-chamber supply line directly.

The latter pre-chamber fuel supply concept can be applied, e.g., for lean burn internal combustion engines, especially lean burn gas engines which are provided with a fuel-air mixture comprising a lambda value between approximately 1.2 and 2.0 (at full load with 1.6 to 2.2). Therefore, also the pre-chamber is scavenged with a fuel-air mixture with the same lambda value when the fuel-air mixture is supplied to the pre-chamber via a dedicated pre-chamber supply line (e.g., which is branched-off the intake manifold or the intake port) directly.

A further concept is the supply of an air-fuel mixture to the pre-chamber with a lambda value of about 1 with additional EGR (exhaust gas circulation) content.

Therefore, the pre-chamber can be supplied in the first operation mode according to one or all of the before-mentioned pre-chamber fuel or air-fuel mixture supply concepts.

In a second operation mode, according to certain embodiments of the invention, it can be provided that a majority of fuel—preferably a second fuel—is supplied to the main combustion chamber via the pre-chamber using the pre-chamber intake system.

In the context of certain embodiments of the invention, "majority of a fuel energy amount" means more than 50% of the predetermined fuel energy amount.

By use of certain embodiments of the invention, a simple possibility can be generated by use of two operation modes to operate the same internal combustion engine in different ways and therefore by use of different fuels.

In this way, certain embodiments of the invention provide an internal combustion engine and a method for operating an internal combustion engine, wherein a higher flexibility for different fuel types is given without introducing additional fuel injectors which keeps the manufacturing process simple and the costs low. Furthermore, alternative fuels such as hydrogen can be used for combustion, wherein the emissions can be reduced and/or the efficiency can be increased.

Current internal combustion engines can be retrofitted with at least one fuel supply line for the pre-chamber.

Certain embodiments of invention can be used for common internal combustion engines, specifically gas engine power plants comprising a pre-chamber.

Such a reciprocating piston engine can, of course, have several cylinders and certain embodiments of the invention can be realized for one of the cylinders, a sub-set of the cylinders or all of the cylinders, in particular some cylinder banks or all cylinder banks, if more cylinder banks are present.

The cylinder may be delimited by parts of an internal combustion engine, such as a cylinder liner and/or a crank case and/or a cylinder head and/or a piston.

Advantageous embodiments are defined in the dependent claims.

Preferably, the internal combustion engine, according to certain embodiments of the invention, is a stationary reciprocally working engine which, preferably is used as part of a genset.

It can be provided that the control unit is configured to control the supply of air—preferably charged air—via the main combustion chamber intake system in the second operation mode.

Therefore, it can be provided that only fuel is supplied by the pre-chamber intake system in the second operation mode via the pre-chamber to the main combustion chamber, wherein in the main combustion chamber the fuel is mixed with air supplied by the main combustion chamber intake system.

It can be provided that, in the second operation mode, a lambda value distribution is achieved in the pre-chamber and the main combustion chamber at a predefined ignition time. The lambda value distribution is preferably achieved during a compression stroke by mixing supplied air—preferably charge air—with the fuel supplied via the pre-chamber.

It can be provided that the control unit is configured to supply 70% to 100%—preferably 100%—of the fuel energy amount for the combustion in the main combustion chamber via the pre-chamber to the main combustion chamber by use of the pre-chamber intake system in the second operation mode.

Therefore, it can be provided that 0% to 30% of the fuel energy amount provided for the main combustion chamber can be supplied by the main combustion chamber intake system in the second operation mode.

Preferably, it can be provided that the fuel amount supplied via the pre-chamber intake system and the fuel amount supplied by the main combustion intake system are pre-mixed with air, particularly preferred charged air.

It can be provided that the control unit is configured to control the supply of an air-fuel-mixture by the main combustion chamber intake system in the first operation mode.

It can be provided that the control unit is configured to operate the internal combustion engine during a first operation mode by the following steps:
  supplying a fuel or an air-fuel-mixture, preferably natural gas or an air-natural gas-mixture, with a predefined fuel energy amount to the pre-chamber at a time period during an intake stroke and/or a compression stroke by using the pre-chamber intake system, and/or
  supplying an air-fuel-mixture, preferably natural gas or an air-natural gas-mixture, with a predefined fuel energy amount into the main combustion chamber by use of the main combustion intake system—preferably an inlet valve—at a time period during an intake stroke, wherein the fuel energy amount supplied to the main combustion chamber is in a range of 90%-99% of the entire fuel energy amount supplied per cycle.

During the compression phase in a first operation mode, the fuel-air mixture of the main combustion chamber flows through the transfer passages into the pre-chamber, where it mixes with the present fuel or fuel-air mixture present in the pre-chamber.

It can be provided that the main combustion chamber intake system comprises an inlet valve system, preferably a variable valve timing system.

It can be provided that the pre-chamber inlet system comprises an active pre-chamber gas valve, preferably a solenoid valve or an active and a passive pre-chamber gas valve, wherein the passive pre-chamber gas valve is a check valve arranged downstream from the active pre-chamber gas valve.

The main combustion intake system can be provided by a gas mixer with an air-fuel-mixture. Preferably, it can be provided that the gas mixer is provided for mixing air and natural gas.

It can be provided that the pre-chamber intake system comprises two different fuel sources. Preferably, it can be provided that in the first operation mode a fuel is supplied to the pre-chamber being the same fuel as supplied to the main combustion chamber, and in the second operation mode a fuel is supplied to the pre-chamber being different as supplied in the first operation mode.

It can be provided that in the first operation mode the pre-chamber intake system is fluidically coupled to the main combustion intake system, wherein the same fuel and/or air-fuel mixture is delivered to the main combustion chamber and the pre-chamber.

The internal combustion engine preferably comprises:
  an air filter for filtering an intake of ambient air,
  a turbocharger for charging intake air or air-fuel mixture, an intercooler for cooling down—preferably charged—intake air or air-fuel mixture, and/or a throttle valve arranged in the main combustion intake system for controlling the internal combustion engine.

It can be provided that the control unit is configured to provide the main combustion engine in the first operation mode with a first fuel and in the second operation mode with a second fuel, wherein preferably the first fuel and the second fuel having a different fuel quality. Therefore, it could be provided that the first fuel is a fuel gas composed of hydrocarbons—preferably natural gas—and the second fuel is a carbon-free fuel gas, preferably hydrogen.

More general, with "different fuel quality" a different ignitability could be meant, which can be understood as the property of how readily an air-fuel-mixture ignites, in particular self-ignites (uncontrolled combustion). The ignitability of an air-fuel-mixture is, of course, influenced by the fuel used in the air-fuel-mixture. For example, (molecular) hydrogen has a very high tendency for uncontrolled ignition (low methane number), while, e.g., methane has a relatively low tendency for uncontrolled ignition (high methane number).

With "different fuel quality" also a different heating value could be meant.

Preferably, it can be provided that fuel supplied to the main combustion chamber via the pre-chamber supply system has a pressure in a range between 15 bar and 50 bar, more preferably between 30 bar and 40 bar.

For the second fuel, also other fuels than hydrogen can be applicable, especially fuels with can be provided within the before-mentioned pressure range.

It can be provided that an active valve is arranged in the fuel supply line downstream of a second pressurizing device. Preferably, an active valve is arranged in the fuel supply line downstream of the second pressurizing device and upstream of a passive pre-chamber valve, the passive valve being arranged in the vicinity of or in of the pre-chamber.

It can be provided that the control unit is configured to switch between the first operation mode and the second operation mode.

It can be provided that the control unit is configured to switch over from the first operation mode to the second operation mode by the following steps:

supplying a fuel or an air-fuel-mixture, preferably natural gas or an air-natural gas-mixture, with a predefined fuel energy amount to the pre-chamber at a time period during an intake stroke and/or a compression stroke by using the pre-chamber intake system, supplying an air-fuel-mixture, preferably natural gas or an air-natural gas-mixture, with a predefined fuel energy amount into the main combustion chamber by use of the main combustion intake system—preferably an inlet valve—at a time period during an intake stroke, wherein the fuel energy amount supplied to the main combustion chamber is in a range of 90%-99% of the entire fuel energy amount supplied per cycle, and switching into the second operating mode.

It can be provided that the control unit is configured to switch over from the second operation mode into the first operation mode by the following steps:

supplying a fuel or an air-fuel-mixture, preferably hydrogen, into the main combustion chamber via the pre-chamber by use of the pre-chamber intake system, reducing the amount of fuel or air-fuel-mixture supplied to the main combustion chamber via the pre-chamber by use of the pre-chamber intake system and accordingly increasing a fuel or air-fuel-mixture supplied to the main combustion chamber by use of the main combustion chamber intake system, wherein the total fuel energy amount supplied to the main combustion chamber by the main combustion chamber intake system and the pre-chamber intake system is kept essentially the same until a desired majority of fuel is supplied by the main combustion chamber intake system, and switching to the first operating mode.

For some applications it can be provided, that switching between the first and the second fuel supply operation mode is executed within a specific, preferably a predefined, time period.

BRIEF DESCRIPTION OF THE DRAWINGS

Further details and advantages of the invention are apparent from the accompanying figures and the following description of the drawings

DETAILED DESCRIPTION

Figure 1:
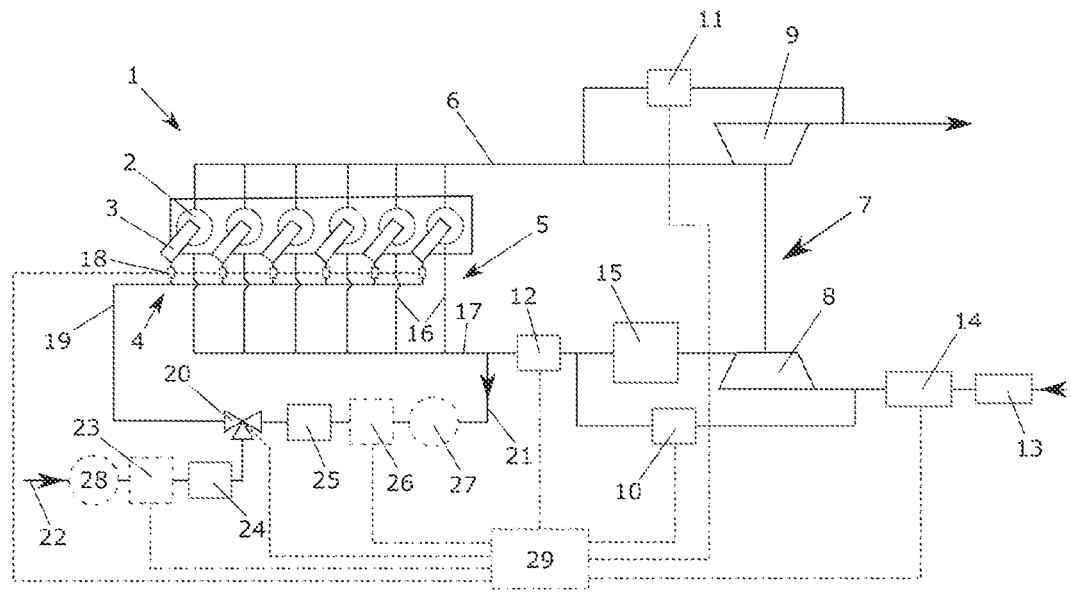
FIG. 1 shows a schematic representation of the parts of an internal combustion engine 1. In the embodiment shown in FIG. 1, the internal combustion engine is represented by six main combustion chambers 2, wherein each main combustion chamber 2 is fluidically coupled by transfer passages with a pre-chamber 3.

In the embodiment of FIG. 1, the main combustion chambers 2 of the internal combustion engine 1 can be directly supplied by an air or air-fuel-mixture by use of the main combustion intake system 5.

The main combustion intake system 5 shown by the embodiment of FIG. 1 comprises intake ports 16 providing the air or air-fuel-mixture, which is supplied via intake valves (not all shown here for reasons of clarity) to the main combustion chambers 2.

The intake ports 16 are connected to an intake manifold 17, wherein by using the intake manifold 17 the air or air-fuel-mixture (e.g., a mixture of air and natural gas) can be provided for the intake port 16.

The intake manifold 17 is used to provide air or an air-fuel-mixture for more than one main combustion chamber 2 (as can be seen in FIG. 1). In most cases, the intake manifold 17 fluidically connects the intake ports 16 with an air or air-fuel-mixture source, e.g., a gas mixer 14.

The shown intake system 5 further comprises a turbocharger 7, wherein a compressor 8 of the turbocharger 7 is driven by the exhaust turbine 9 arranged in the exhaust line 6.

The exhaust line 6 passes the exhaust gases after combustion in the main combustion chambers 2 to the exhaust turbine 9 of the turbocharger 7, wherein the exhaust turbine 9 is driven by the exhaust flow.

The exhaust turbine 9 is coupled by a shaft with the compressor 8, wherein the compressor 8 is driven by the exhaust turbine 9.

The turbocharger 7 can be controlled by controlling the wastegate 11 and the compressor bypass valve 10, wherein by use of the wastegate 11 an exhaust flow bypassing the exhaust turbine 9 can be varied and by use of the compressor bypass valve 10 an air-fuel-mixture flow bypassing the compressor 8 can be controlled for controlling a boost pressure generated by the turbocharger 7.

The compressor 8 is arranged in the intake system 5 in a flow direction downstream of the gas mixer 14 and charges the air-fuel-mixture provided by the gas mixer 14 according to a desired boost pressure.

The gas mixer 14 mixes an air provided by an air filter 13 with a fuel, e.g., a natural gas. The gas mixer 14 shown by this embodiment is a gas mixer 14 working according to the venturi principle.

In a flow direction downstream of the compressor 8 and the compressor bypass line, an intercooler 15 is provided for cooling down the charged air or air-fuel-mixture to increase the combustion efficiency.

Between the intercooler 15 and the main combustion chambers 2 (or the branches of the intake ports 16), a throttle valve 12 is provided for controlling the air or air-fuel-flow passed to the main combustion chambers 2.

The pre-chambers 3 can be supplied by the pre-chamber intake system 4, wherein an air-fuel-mixture or a fuel can be provided by the pre-chamber intake system 4 for the pre-chambers 3.

The pre-chamber intake system 4 comprises active pre-chamber gas valves 18, which are arranged at each pre-chamber 3 for controlling the supply to the pre-chambers 3 during an intake stroke and/or partially during compression stroke.

It can be provided that a single active pre-chamber gas valve 18 for at least one or each pre-chamber 3 is arranged in a spark plug sleeve, in a pre-chamber 3, or in a cylinder head directly (not shown in detail).

In another embodiment, it can be provided that the active pre-chamber valve 18 is arranged upstream of a passive check valve (not shown). The active pre-chamber valve 18 can then be arranged in the pre-chamber intake system 4 for at least one or each pre-chamber 3. A benefit of such an arrangement would be that the already existing passive check valve could be used for a method according to certain embodiments of the invention by simply adding the active pre-chamber valve 18, which would experience lower thermal load and pressure than the passive check valve.

Via the pre-chamber gas valves 18, a fuel or air-fuel mixture can be supplied by use of the pre-chamber supply line 19.

The pre-chamber supply line 19 comprises a control valve 20, wherein the pre-chamber supply line 18 can be switched between two different fuel sources.

In the first operation mode of the internal combustion engine 1, the pre-chamber supply line 18 is supplied by a first fuel source via the first supply line 21 (e.g. first fuel supply line). The first supply line 21 branches from the intake manifold 17. It can be provided that the first supply line 21 is branched off the intake ports 16 or directly after the compressor 8 (not shown).

Therefore, in the first operation mode of the internal combustion engine 1, the pre-chambers 3 are supplied by the same air-fuel mixture as the main-combustion chambers 2.

Optionally, a pressurizing device 27 and/or a pressure and/or temperature regulating device 26 can be arranged in the first supply line 21. Preferably, it can be provided that a unidirectional valve 25 is arranged in the first supply line 21.

Figure 2:
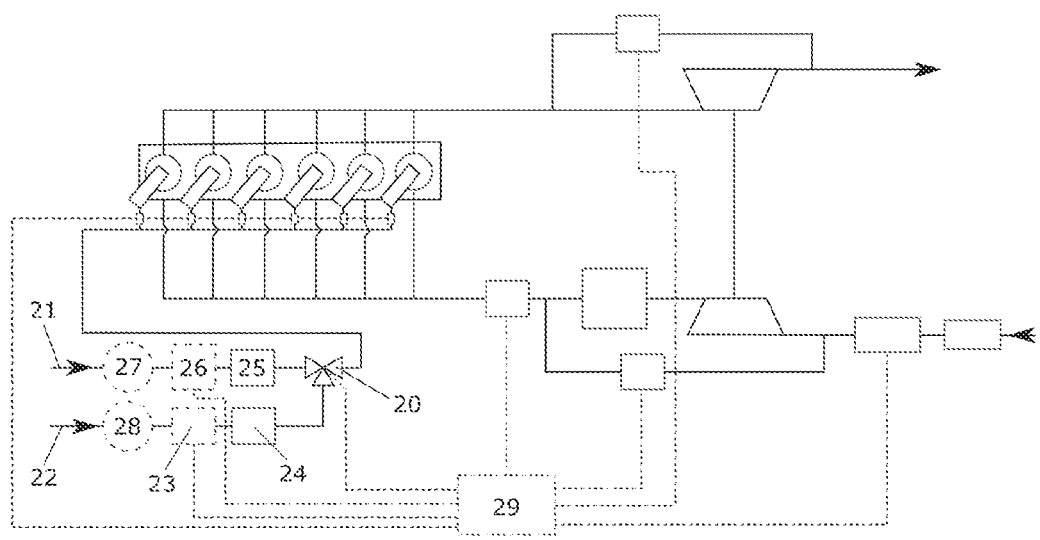
FIG. 2 shows another embodiment of an internal combustion engine 1, wherein the first supply line 21 is connected to an external fuel source.

In an embodiment as shown in FIG. 2, the first supply line 21 can be connected to an external fuel source. Also, for this embodiment, a pressurizing device 27 and/or pressure and/or temperature regulating device 26 can be arranged in the first supply line 21 optionally. Preferably, it can be provided that a unidirectional valve 25 is arranged in the first supply line 21.

Pre-chambers 3 usually serve as ignition intensifiers, in which the fuel-air mixture (that is highly compressed at the end of the compression stroke) is ignited in a relatively small secondary space separate from the main combustion chamber 2 of the cylinders. In this case, a main combustion chamber 2 is delimited by the working piston, the cylinder liner, and (a flame plate of) the cylinder head, wherein the secondary space (the pre-chamber 3) is connected via one or a plurality of transfer passages with the main combustion chamber 2.

As described above, these pre-chambers 3 are scavenged or filled with fuel gas, air-fuel mixture or air-fuel mixture together with an EGR content during the gas exchange phase in order to improve the ignition and combustion properties in the pre-chamber 3.

For this, a small amount of air-fuel mixture is branched off from the intake manifold 17 to the main combustion chamber 2 and fed into the pre-chamber 3 via the control valve 20, the pre-chamber supply line 19, and the pre-chamber gas valves 18.

At full load, large gas engines are usually run lean, at lambda $\lambda$ of approx. 1.6 to 2.2, i.e., the amount of air in the mixture corresponds to about twice the stoichiometric amount of air.

In the second operation mode of the internal combustion engine 1, the control valve 20 can be switched over by a control unit 29 to a second fuel source provided by the second supply line 22 (e.g. second fuel supply line).

As shown in FIGS. 1 and 2, it can be provided that optionally a pressurizing device 28 and/or a pressure and/or temperature regulating device 23 can be arranged in the first supply line 21. Preferably, it can be provided that a unidirectional valve 24 is arranged in the second supply line 22.

The pressurizing device 28 and/or a pressure regulating device 23 could be needed, if the fuel supply pressure in the second supply line 22 (which is dedicated to supply the fuel to the pre-chambers) is outside the range between 15 bar and 50 bar, more preferably between 30 bar and 40 bar.

The control unit 29 is connected by signal leading lines to several components of the internal combustion engine 1 as indicated by the dashed lines.

The second supply line 22 delivers fuel of a different quality, preferably hydrogen, to the pre-chambers 3 via the pre-chamber supply line 18 and the pre-chamber gas valves 18.

In the second operation mode of the internal combustion engine 1, the gas mixer 14 is turned off by a control signal of the control unit 12, wherein only air is passed to the compressor 8.

The charged air is supplied via the intake manifold 17, the intake ports 16, and the intake valves directly to the main combustion chambers, wherein fuel (more precisely hydrogen) is passed to the main combustion chambers 2 via the pre-chambers 3 by use of the pre-chamber intake systems 4 during intake stroke and/or the compression stroke.

During the compression stroke, the hydrogen and the charged air are mixed in the main combustion chamber 2 at the second operation mode.

Therefore, it is possible to equip already existing internal combustion engines 1, which are working with a fuel as natural gas, with a second fuel source for the pre-chamber 2 and a corresponding control unit 29 to achieve a fuel flexibility of the internal combustion engine 1. This can be achieved without additional costly fuel injectors, since the pre-chamber 3 itself acts as a (direct) fuel injector.

LIST OF REFERENCE SIGNS 1 internal combustion engine
2 main combustion chamber
3 pre-chamber
4 pre-chamber intake system
5 main combustion intake system
6 exhaust line
7 turbocharger
8 compressor
9 turbine
10 compressor bypass valve
11 wastegate
12 throttle valve
13 air filter
14 gas mixer
15 intercooler
16 intake ports
17 intake manifold
18 pre-chamber gas valve
19 pre-chamber supply line
20 control valve
21 first supply line
22 second supply line
23 pressure and/or temperature regulating device in second supply line (optional)
24 unidirectional valve second supply line
25 unidirectional valve first supply line
26 pressure and/or temperature regulating device in first supply line (optional)
27 pressurizing device first supply line (optional)
28 pressurizing device first supply line (optional)
29 control unit

The invention claimed is:

1. A system, comprising:
    an internal combustion engine comprising a pre-chamber having a pre-chamber intake system and a main combustion chamber having a main combustion chamber intake system, wherein by use of the pre-chamber intake system and the main combustion chamber intake system a predetermined amount of energy of fuel can be supplied to the main combustion chamber for a combustion; and
    a control unit is configured to control the pre-chamber intake system and the main combustion chamber intake system according to the following operation modes:
        a first operation mode, in which a majority of a fuel energy amount for the combustion in the main combustion chamber is supplied directly to the main combustion chamber by use of the main combustion chamber intake system, and
        a second operation mode, in which a majority of the fuel energy amount for the combustion in the main combustion chamber is supplied via the pre-chamber to the main combustion chamber by use of the pre-chamber intake system;
        wherein, in the first operation mode, the control unit is configured to provide the main combustion chamber with a first fuel and, in the second operation mode, with a second fuel, wherein the first fuel and the second fuel have a different fuel quality;
        wherein, in the first operation mode, the pre-chamber intake system is fluidically coupled to the main combustion intake system and the same first fuel and/or air-fuel mixture is separately delivered to the main combustion chamber and the pre-chamber.

2. The system as set forth in claim 1, wherein the control unit is configured to supply air without fuel via the main combustion chamber intake system in the second operation mode.

3. The system as set forth in claim 1, wherein the control unit is configured to supply an air-fuel-mixture via the main combustion chamber intake system in the first operation mode.

4. The system as set forth in claim 1, wherein the control unit is configured to supply 70% to 100% of the fuel energy amount for the combustion in the main combustion chamber via the pre-chamber to the main combustion chamber by use of the pre-chamber intake system in the second operation mode.

5. The system as set forth in claim 4, wherein the control unit is configured to supply at least 90% of the fuel energy amount for the combustion in the main combustion chamber directly to the main combustion chamber by use of the main combustion intake system in the first operation mode.

6. The system as set forth in claim 5, wherein the first fuel is a fuel gas comprising hydrocarbons or natural gas, and the second fuel is a carbon-free fuel gas or hydrogen.

7. The system as set forth in claim 1, wherein the main combustion chamber intake system comprises an inlet valve system having a variable valve timing system.

8. The system as set forth in claim 1, wherein the pre-chamber inlet system comprises an active pre-chamber gas valve, a passive pre-chamber gas valve, or a combination thereof, wherein the passive pre-chamber gas valve comprises a check valve arranged downstream from the active pre-chamber gas valve.

9. The system as set forth in claim 1, wherein the main combustion intake system comprises a gas mixer for mixing air with fuel.

10. The system as set forth in claim 1, wherein the pre-chamber intake system comprises two different fuel sources.

11. The system as set forth in claim 1, wherein the first fuel comprises a hydrocarbon fuel and the second fuel comprises hydrogen.

12. The system as set forth in claim 1, wherein the internal combustion engine comprises
    an air filter for filtering an intake of ambient air,
    a turbocharger for charging intake air or air-fuel mixture,
    an intercooler for cooling down intake air or air-fuel mixture, and/or
    a throttle valve arranged in the main combustion intake system for controlling the internal combustion engine.

13. A method for operating an internal combustion engine comprising a pre-chamber having a pre-chamber intake system and a main combustion chamber having a main combustion chamber intake system, wherein by use of the pre-chamber intake system and the main combustion chamber intake system a predetermined amount of energy of fuel can be supplied to the main combustion chamber for a combustion, wherein, via control by a control unit:
    in a first operation mode a majority of fuel energy amount for the combustion in the main combustion chamber is supplied directly to the main combustion chamber by use of the main combustion chamber intake system, and
    in a second operation mode, wherein the majority of fuel energy amount for the combustion in the main combustion chamber is supplied via the pre-chamber to the main combustion chamber by use of the pre-chamber intake system;

wherein, in the first operation mode, the main combustion chamber is provided with a first fuel and, in the second operation mode, with a second fuel, wherein the first fuel and the second fuel have a different fuel quality;

wherein, in the first operation mode, the pre-chamber intake system is fluidically coupled to the main combustion intake system and the same first fuel and/or air-fuel mixture is separately delivered to the main combustion chamber and the pre-chamber.

14. The method as set forth in claim 13, comprising supplying air without fuel via the main combustion chamber intake system in the second operation mode.

15. The method as set forth in claim 13, wherein the first fuel comprises a hydrocarbon fuel, and the second fuel comprises hydrogen.

16. The method as set forth in claim 13, comprising supplying 70% to 100% of fuel energy amount for the combustion in the main combustion chamber via the pre-chamber to the main combustion chamber by use of the pre-chamber intake system in the second operation mode.

17. A system, comprising:
 a control unit configured to control a pre-chamber intake system coupled to a pre-chamber and a main combustion chamber intake system coupled to a main combustion chamber of an internal combustion engine, according to the following operation modes:
  a first operation mode, in which a majority of a fuel energy amount for the combustion in the main combustion chamber is supplied directly to the main combustion chamber by use of the main combustion chamber intake system, wherein, in the first operation mode, the control unit is configured to supply a first fuel comprising a hydrocarbon fuel; and
  a second operation mode, in which a majority of the fuel energy amount for the combustion in the main combustion chamber is supplied via the pre-chamber to the main combustion chamber by use of the pre-chamber intake system, wherein, in the second operation mode, the control unit is configured to supply a second fuel comprising hydrogen.

18. The system as set forth in claim 17, wherein the control unit is configured to supply air without fuel via the main combustion chamber intake system in the second operation mode.

19. The system as set forth in claim 17, wherein the control unit is configured to supply the first fuel separately to the main combustion chamber via the main combustion chamber intake system and to the pre-chamber via the pre-chamber intake system in the first operation mode.

20. The system as set forth in claim 17, wherein the control unit is configured to supply 70% to 100% of fuel energy amount for the combustion in the main combustion chamber via the pre-chamber to the main combustion chamber by use of the pre-chamber intake system in the second operation mode.

* * * * *